May 13, 1952  W. J. GILMORE  2,596,144
COUPLING FOR SHOCK ABSORBER CORDS
Filed June 6, 1946

INVENTOR.
WILLIAM J. GILMORE.
BY
*F. J. Schmitt*
ATTORNEY

Patented May 13, 1952

2,596,144

UNITED STATES PATENT OFFICE 2,596,144

COUPLING FOR SHOCK ABSORBER CORDS

William J. Gilmore, United States Navy, Adrian, Mich.

Application June 6, 1946, Serial No. 674,694

2 Claims. (Cl. 287—78)

(Granted under the act of March 3, 1883, as amended April 30, 1928; 370 O. G. 757)

This invention relates to new and useful improvements in connections or fastenings for the ends of elastic shock absorber cord and more particularly to a tubular metal connector.

Cords made of an elastic material, such as rubber, bound and surrounded with a woven fabric made of, for example, cotton, are often used to absorb shocks where heavy loads are required to be rapidly started from rest or brought to rest quickly, such as in aircraft shock absorbers, tow target cables, etc., with the result that a large amount of energy must be absorbed by the materials in said cord. This absorption of energy results in an initial stretching of the elastic cord assembly with a consequent material reduction in its cross-sectional area such that a suitable holding device is required for attaching said cord to any stationary support or object or the joining together of two ends of the said cord so as to form a single piece.

The principal object of this invention is to provide a holding or fastening device for the ends of an elastic cord.

Another object of this invention is to form a connection for an elastic cord with itself or to a stationary object such that there is as little interference with the elasticity of said shock absorbing medium as possible.

Another object of this invention is to obtain a connector such that the fabric covering of said flexible cord and its flexible core will not be broken or damaged during the operation, when stretching or contracting under a load.

Still another object of this invention is to make a joint or fastening of said cord such that the flexible core is not damaged, so as to reduce its strength below that of the portion of the cord outside the area of said connection.

Still another object of this invention is to form a connector that is simple, durable, and easy to manufacture, and easily applied to the parts to be joined.

A further object of this invention is to make the joint of said cord as strong as the cord itself so that there will be no failure of the cord at its junction.

Still another object of this invention is to form a connection such that the cord fabric covering or the core of said cord will not become frayed or broken due to chafing action between the connector and the cord.

And still a further object of this invention is to make a connector in one piece from stock material.

These and other objects of this invention and the various features and details of the construction and operation thereof are hereinafter more fully set forth and described with reference to the accompanying drawing, in which the various figures portray a succession of forming operations resulting in the finished connector.

Referring now to the drawing, in which the various operations involved in forming and installing the connector and the means for performing these operations are portrayed, and in which the various views are shown isometrically and like numbers refer to like parts:

Fig. 2 shows the tubular connector crimped by means of a die;

Fig. 3 shows the next step of squeezing the connector of Fig. 2; and

Fig. 4 shows an isometric transverse sectional view of half of the final connector member.

Figure 1:
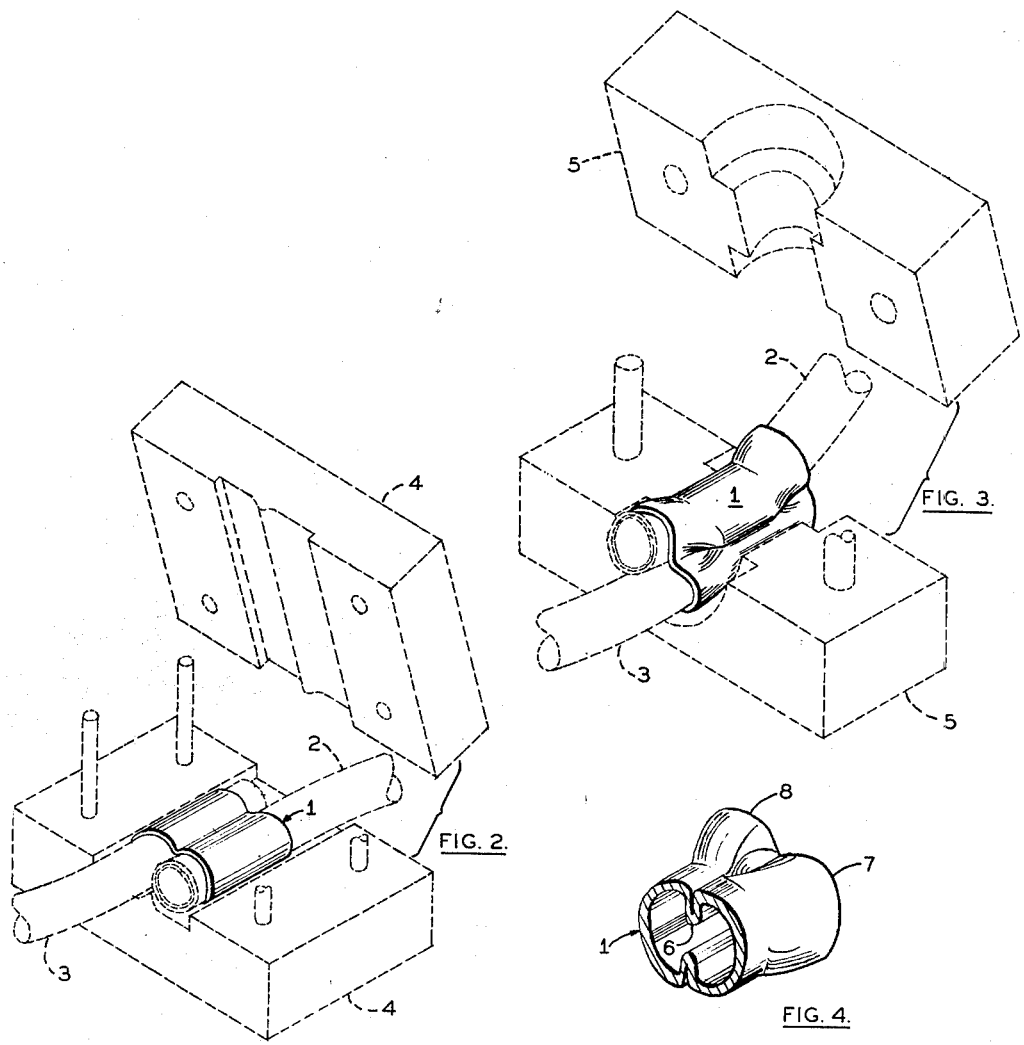
Fig. 1 shows the tubular connector joining two cord members together.
Figure 1:
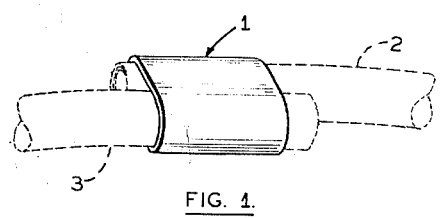

In the drawings, tubular sleeve member 1 is elliptical in shape as shown in Fig. 1 embracing flexible cords 2 and 3. These cords are preferably of rubber covered with a fabric of any suitable material.

The tubular sleeve member 1 is then inserted in die 4 and crimped as shown. The grooves formed in sleeve member 1 result in a closer and firmer grip.

The tubular sleeve connector 1 is finally inserted in die 5 which applies a squeezing operation to the medial portion of the sleeve resulting in the section shown in Fig. 4. Crimping grooves 6 tend to firmly grip core members 2 and 3 wherein flared portions 7 and 8 are so formed about each core member as to eliminate breaking, cracking, or fraying of either the cord member or the fabric covering as they leave fitting 1.

Sleeve 1 may be of rolled or extruded metal so that it fits freely over cords 2 and 3. Assembly of sleeve 1 and cords 2 and 3 is made after which the crimping operation of die 4 and the squeezing operation of die 5 can be readily performed. In the operation of die 5, metal fitting 1 is folded around each cord so as to clamp each cord securely in the fitting while flared portions 7 and 8 clear each cord as they leave the fitting, thus gradually reducing the pressure of the grip and permitting resilience of the rubber in the cord.

By this device a simple, secure coupling of two flexible fabric covered cords is made in a rapid and inexpensive manner and so that said coupling assembly is as strong or stronger in tension than the cords 2 and 3 are at any point outside of fitting 1.

While a particular embodiment of this invention has been illustrated and described herein, it is not intended that this invention be limited to such disclosure, and changes and modifications may be made and incorporated within the scope of the appended claims.

The invention described herein may be manufactured and used by or for the Government of the United States of America for governmental purposes without the payment of any royalties thereon or therefor.

What is claimed is:

1. A connector for adjacent rubber cord members comprising a malleable sleeve substantially elliptical in cross section surrounding said cord members, said sleeve being crimped inwardly at its medial portion to form an inner rib on each side lengthwise of said sleeve, said sleeve constructed and arranged to receive a pair of cord members and to be compressed along its medial portion for a large portion of its length not including the ends to the extent that said cord members are compressed and reduced in cross section and shaped to two semi-circular portions with their bases being in contact over a medial portion, the cross sectional areas of the two portions of the cord members thus compressed and shaped being less than their original cross sectional areas, the portions of said cord members immediately adjacent said compressed portions tapering to their original cross sectional areas without sharp changes in cross sectional areas.

2. Method for connecting adjacent rubber cord members comprising placing a malleable sleeve connector substantially elliptical in cross section over the overlapping portion of a pair of contacting rubber cord members, applying deforming pressure to the sleeve in the direction of its minor axis to shape said sleeve into close contact with said cord members, then applying deforming pressure to the assembly along the medial portion of said sleeve in the direction of the original major axis of said connector to compress and shape said cord members into two semi-circular portions with their bases being in contact over a medial portion, the cross-sectional areas of the two portions as formed being less than their original cross-sectional areas, the portions of said cord members immediately adjacent said compressed portions tapering to their original cross-sectional areas without sharp changes in cross-sectional areas.

WILLIAM J. GILMORE.

REFERENCES CITED

The following references are of record in the file of this patent:

UNITED STATES PATENTS

| Number | Name | Date |
| --- | --- | --- |
| 347,625 | McIntire | Aug. 17, 1886 |
| 1,727,895 | Mraz | Sept. 10, 1929 |
| 2,276,571 | Grypma | Mar. 17, 1942 |
| 2,327,683 | Warner et al. | Aug. 24, 1943 |

FOREIGN PATENTS

| Number | Country | Date |
| --- | --- | --- |
| 24,763 | France | June 26, 1922 |
| 193,065 | Great Britain | Feb. 12, 1923 |
| 254,793 | Italy | Sept. 15, 1927 |
| 285,542 | Great Britain | Feb. 13, 1928 |
| 339,832 | Germany | Aug. 13, 1921 |
| 616,991 | Germany | Aug. 9, 1935 |
| 752,938 | France | July 31, 1933 |